T. Uehting,
Cultivator.

No. 95,956. Patented Oct. 19, 1869.

Witnesses
George W. Mabee.
Oscar Hinchman.

Inventor.
T. Uehting.
per Munn & Co
Attys.

UNITED STATES PATENT OFFICE.

THEODOR UEHLING, OF LOGAN, NEBRASKA.

IMPROVEMENT IN ROTATING CULTIVATORS.

Specification forming part of Letters Patent No. 95,956, dated October 19, 1869.

*To all whom it may concern:*

Be it known that I, THEODOR UEHLING, of Logan, in the county of Dodge and State of Nebraska, have invented a new and Improved Rotating Cultivator; and I do hereby declare that the following is a full, clear, and exact description thereof, which will enable others skilled in the art to make and use the same, reference being had to the accompanying drawings, forming part of this specification.

This invention relates to a novel construction of a cultivator for tilling the ground; and it consists in forming on a central eye and rotating on a central pivot a number of arms with cultivator-teeth, either formed on or attached to their ends, which arms and teeth are held in position by a spring-slide on the beam to which the cultivator is attached.

Figure 1:
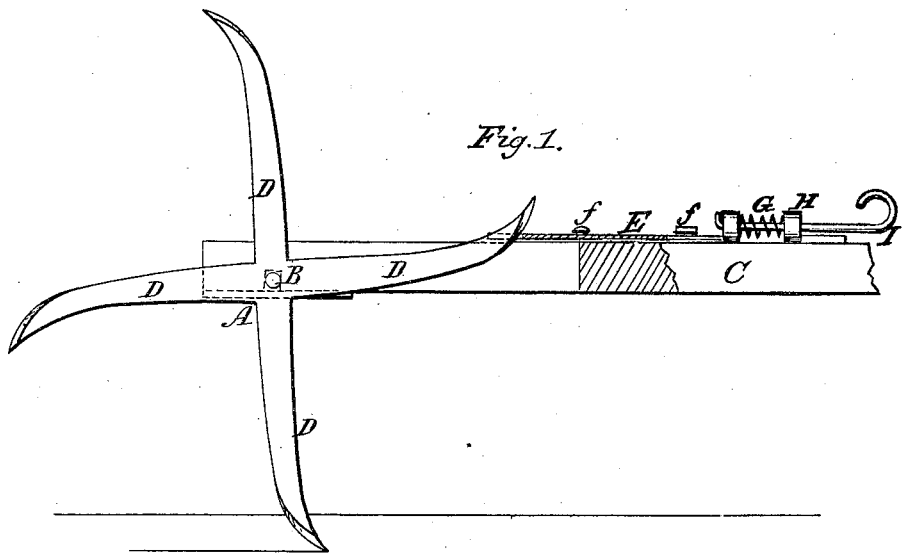
Figure 2:
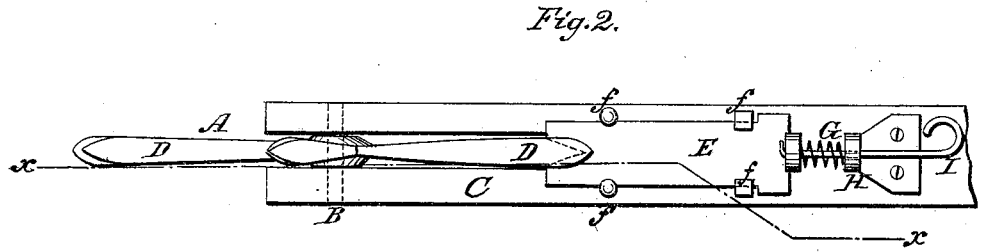

In the accompanying plate of drawings, Figure 1 represents a side elevation, in section, through the line $x\,x$ of Fig. 2. Fig. 2 is a top or plan view.

Similar letters of reference indicate corresponding parts.

A is the rotating cultivator, which is made to turn or rotate on its axis B.

C is the beam to which the cultivator is attached.

The ends of the arms D are formed like the tooth of the ordinary cultivator, or cultivator-teeth may be attached, by any suitable means, to the arms, and in either case the teeth may vary in size and shape, so as to adapt them to different kinds of tillage or for different crops or plants.

E is the slide by which the cultivator is held in position for using any particular one of the arms. This plate E is held in position by suitable guides, $f\,f$, and is forced forward toward the teeth by the spring G, which bears against the projection H with a constant pressure.

I is a wire, which passes through the lug or projection H and through the spring, and is attached to the slide E, as seen in the drawings.

Whenever it is desired to rotate the cultivator either the whole or a part of a revolution it is necessary to draw back the slide from the tooth.

A number of these rotating cultivators may be attached to a wheeled vehicle, which adapts it for all or nearly all the purposes to which cultivators are applied.

Having thus described my invention, I claim as new and desire to secure by Letters Patent—

1. The cultivator A, constructed and operated substantially as described, for the purposes set forth.

2. In combination with a rotating cultivator, the slide E, arranged and operated substantially as shown and described, for the purposes specified.

THEODOR UEHLING.

Witnesses:
   EDWARD FLEISCHHEINER,
   JACOB SCHWAB.